United States Patent
Gukelberger et al.

(10) Patent No.: US 10,513,992 B1
(45) Date of Patent: Dec. 24, 2019

(54) INTERNAL COMBUSTION ENGINE HAVING DEDICATED EGR CYLINDER(S) WITH SPLIT INTAKE AND CYLINDER DEACTIVATION AT LOW LOADS

(71) Applicant: Southwest Research Institute, San Antonio, TX (US)

(72) Inventors: Raphael Gukelberger, Freudenstadt (DE); Steven Almaraz, Seguin, TX (US); Forest C. Gibson, Von Ormy, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 16/230,770

(22) Filed: Dec. 21, 2018

(51) Int. Cl.
  *F02D 41/00* (2006.01)
  *F02M 26/43* (2016.01)
  *F02B 47/08* (2006.01)
  *F02M 26/05* (2016.01)
  *F02D 17/02* (2006.01)

(52) U.S. Cl.
  CPC ....... *F02D 41/0087* (2013.01); *F02D 17/023* (2013.01); *F02D 41/0055* (2013.01); *F02D 41/0077* (2013.01); *F02M 26/05* (2016.02); *F02M 26/43* (2016.02); *F02D 2200/10* (2013.01)

(58) Field of Classification Search
  CPC ............... F02D 41/008; F02D 41/0087; F02D 41/0077; F02D 41/0055; F02D 17/023; F02D 2200/10; F02M 26/05; F02M 26/43; F02M 26/71; F02M 2026/001; F02M 35/10222; F02B 47/08; F02B 47/10
  See application file for complete search history.

(56) References Cited

U.S. PATENT DOCUMENTS

| | | | | |
|---|---|---|---|---|
| 8,893,687 | B2 * | 11/2014 | Gingrich | F02D 41/0065 123/315 |
| 9,650,976 | B2 * | 5/2017 | Gingrich | F02M 26/43 |
| 9,845,747 | B2 * | 12/2017 | Denton | F02M 26/43 |
| 9,925,974 | B2 * | 3/2018 | Leone | B60W 10/06 |
| 9,957,911 | B2 * | 5/2018 | Sczomak | F02M 26/15 |
| 10,100,760 | B2 * | 10/2018 | Keating | F02M 26/49 |

* cited by examiner

*Primary Examiner* — Grant Moubry
(74) *Attorney, Agent, or Firm* — Livingston Law Firm

(57) ABSTRACT

A method of operating a split intake D-EGR (dedicated exhaust gas recirculation) engine having at least one D-EGR cylinder and a number of non-EGR cylinders. If the engine is in a low load operating condition, either of two cylinder deactivation modes may be performed. In first cylinder deactivation mode, the D-EGR cylinder(s) are deactivated by disabling fuel delivery to the D-EGR cylinder(s), closing a D-EGR throttle, closing a D-EGR valve, and operating a three-way valve on the main exhaust line such that no exhaust from the D-EGR cylinder(s) is exhausted. In a second cylinder deactivation mode, the non-EGR cylinders are deactivated by disabling fuel delivery to the non-EGR cylinders, opening the D-EGR throttle, closing the D-EGR valve, and operating the three-way valve such that no exhaust from the main cylinders is exhausted.

14 Claims, 11 Drawing Sheets

INTERNAL COMBUSTION ENGINE HAVING DEDICATED EGR CYLINDER(S) WITH SPLIT INTAKE AND CYLINDER DEACTIVATION AT LOW LOADS

TECHNICAL FIELD OF THE INVENTION

This invention relates to internal combustion engines, and more particularly to internal combustion engines having one or more D-EGR (dedicated exhaust gas recirculation) cylinders and split intake.

BACKGROUND OF THE INVENTION

In an internal combustion engine system having D-EGR (dedicated exhaust gas recirculation), one or more cylinders of the engine are dedicated to operate in a rich combustion mode. Because of the rich combustion, the exhaust gases from the dedicated cylinder(s) have increased levels of hydrogen and carbon monoxide. Rich combustion products such as these are often termed "syngas" or "reformate".

D-EGR engines use the reformate produced by the dedicated cylinder(s) in an exhaust gas recirculation (EGR) system. The hydrogen-rich reformate is ingested into the engine for subsequent combustion by the non-dedicated cylinders and optionally by the dedicated cylinder(s). The reformate is effective in increasing knock resistance and improving dilution tolerance and burn rate. This allows a higher compression ratio to be used with higher rates of EGR and reduced ignition energy, leading to higher efficiency and reduced fuel consumption.

For spark ignited engines, D-EGR and others, to address high engine pumping/throttling losses at idle and low loads, various cylinder deactivation (CDA) strategies have come into use. By shutting off all intake and exhaust valves to a subset of cylinders, and cutting off their fuel supply, the inducted fresh charge volume can be reduced without using the engine throttle. As an example, an inline four-cylinder engine with two deactivated cylinders (50% CDA) can operate at approximately half the engine load without having to throttle the fresh charge compared to a non-CDA engine. Because the deactivated cylinders act as an "air spring" the majority of the compression work is regained during the expansion stroke. As a result, pumping work is greatly reduced at part loads, leading to improved efficiency. Furthermore, to achieve a given engine torque, the non-deactivated cylinders must operate at a higher indicated mean effective pressure (IMEP). For instance, if 50% CDA is being used, the non-deactivated cylinders operate at twice the IMEP as the same engine without cylinder deactivation. At non-knock limited idle and part load conditions, greater IMEPs improve combustion efficiency, burn rates, combustion stability as well as emissions.

A conventional approach to achieving cylinder deactivation is to disable the intake and exhaust valves of the deactivated cylinders. This may be accomplished by disabling valve lift, such as by using a "lost motion" valvetrain with a cam lobe on a round base circle. This variability of valve action requires sophisticated valvetrains with hydraulic, electric or pneumatic actuators to switch between different cam lobes. Another approach is to disable the piston motion of individual cylinders by use of complicated mechanisms.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to implementing CDA (cylinder deactivation) in a split intake D-EGR engine with a common valve train. Selected cylinders (either the D-EGR cylinder or the non-D-EGR cylinders) are deactivated without closing their intake or exhaust valves.

The CDA method does not require modification of engine components specific to CDA. In other words, the CDA method avoids a need to modify the valvetrain with switchable cam lobes or piston motion decoupling mechanisms.

D-EGR Engine with Split Intake

Figure 1:
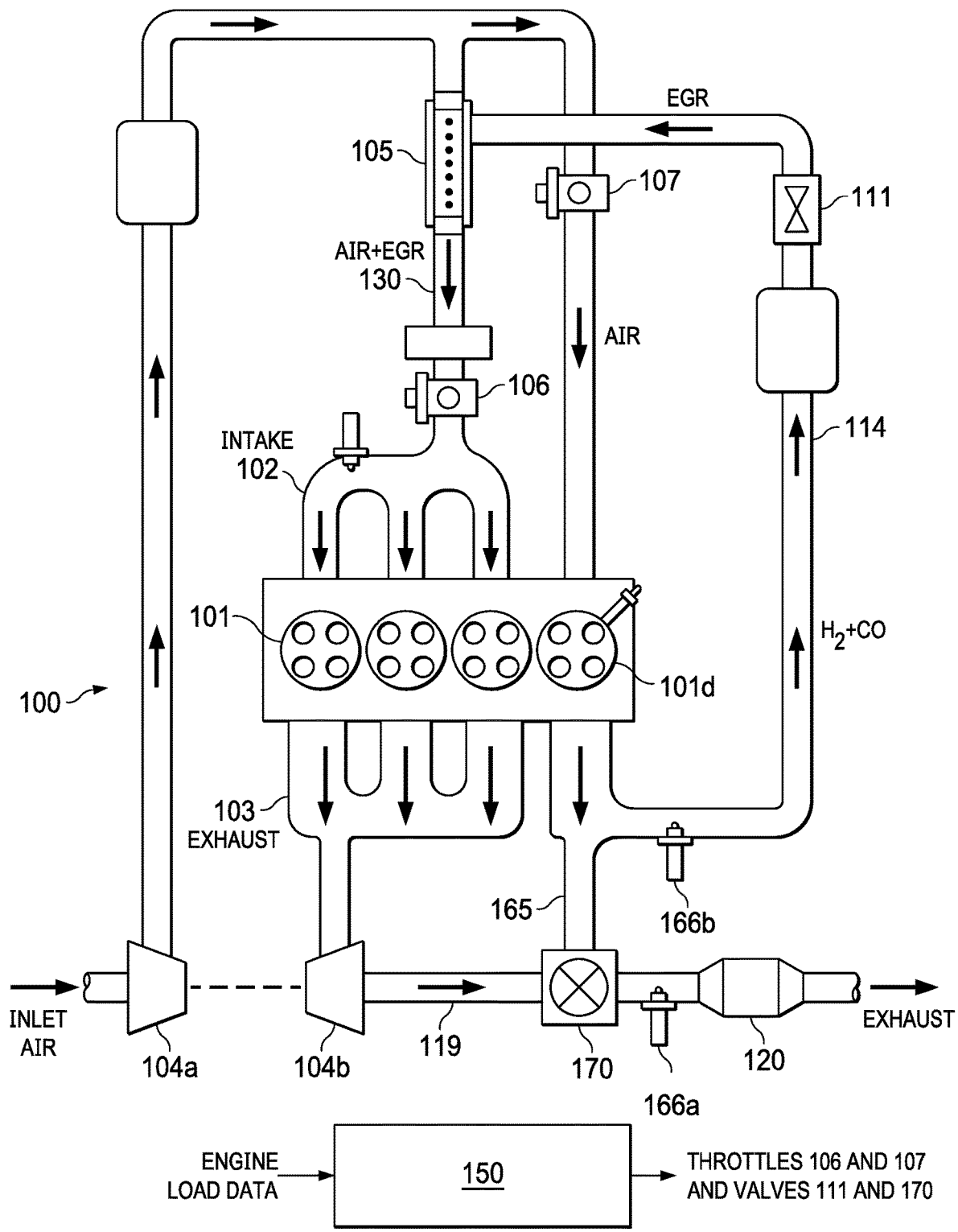
FIG. 1 illustrates an internal combustion engine having four cylinders, one of which is a dedicated EGR (D-EGR) cylinder, and having split intake and being configured for CDA in accordance with the invention.

FIG. 1 illustrates an internal combustion engine 100 having four cylinders 101d, and configured for CDA in accordance with the methods described herein. One of the cylinders is a dedicated EGR (D-EGR) cylinder and is identified as cylinder 101d. The exhaust of the D-EGR cylinder 101d is routed back to the intake of the other three cylinders 101 as EGR exhaust. These three cylinders 101 are referred to herein as the "main" or "non-dedicated EGR" cylinders.

The intake manifold 102 is configured to separate the fresh air intake between the main cylinders 101 and the D-EGR cylinder 101d. This allows the EGR to be mixed with the fresh air intake of the main cylinders 101, using a mixer 105 and a mixed air input line 130 to the intake manifold 102. The D-EGR cylinder receives fresh air via a separate intake line 131. This D-EGR engine configuration is referred to as a "split intake D-EGR engine".

In the example of FIG. 1, engine 100 is gasoline-fueled and spark-ignited, with each cylinder 101 having an associated spark plug.

The D-EGR cylinder 101d may be operated at any desired air-fuel ratio. It receives only fresh air, and no EGR, which allows it to be operated at a higher equivalence ratio than "shared intake" configurations in which EGR is recirculated to all cylinders. All exhaust of the D-EGR cylinder 101*d* may be recirculated back to the intake manifold 102.

In the embodiment of FIG. 1, the main cylinders 101 are operated at a stoichiometric air-fuel ratio. Their exhaust is directed to an exhaust aftertreatment system via an exhaust manifold 103.

Engine 100 is equipped with a turbocharger, specifically a compressor 104*a* and a turbine 104*b*.

Although not explicitly shown, all cylinders 101 have a fuel delivery system for introducing fuel into the cylinders. For purposes of this description, the fuel delivery system is assumed to be consistent with gasoline direct injection, and each cylinder 101 is equipped with a fuel injector.

In the example of this description, the EGR loop 114 joins the intake line downstream the compressor 104*a*. Mixer 105 mixes the EGR with fresh air, and the mixture is delivered to the intake manifold 102 via the mixed intake line 130. A main throttle 106 on this mixed intake line 130 controls the amount of mixed air intake into the intake manifold 102.

An EGR throttle 107 is installed on the fresh air line 131 that delivers air to the D-EGR cylinder 101. This throttle 107 controls the amount of fresh air into D-EGR cylinder 101*d*.

An EGR exhaust line 165 provides an exhaust path from the D-EGR cylinder 101*d* to the main exhaust line 119. A three-way valve 170 may be used to divert all or some of the EGR from the EGR loop 114 to the main exhaust line, downstream the turbine 104*b* and upstream a three-way catalyst 120.

Engine 100 is also equipped with an EGR valve 111 on the EGR loop 114 upstream of or into mixer 105. This allows EGR flow into the main cylinders 101 to be controlled.

The four-cylinder dedicated EGR system 100 with a single dedicated cylinder can provide a 25% EGR rate. In other dedicated EGR systems, there may be a different number of engine cylinders 101, and/or there may be more than one dedicated EGR cylinder 101*d*. In general, in a split intake D-EGR engine, the exhaust of a sub-group of cylinders can be routed back to the intake of other cylinders thereby providing EGR those cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104*b*, which drives compressor 104*a*. After turbine 104*b*, exhaust gas flows out to a main exhaust line 119 to a three-way catalyst 120, to be treated before exiting to the atmosphere.

As stated above, the dedicated EGR cylinder 101*d* can operate at any equivalence ratio because its recirculated exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 119 and the EGR loop 114 may have a sensor (identified as 166*a* and 166*b*), particularly because the dedicated EGR cylinder may be operated at a different air-fuel ratio than non-dedicated cylinders.

If a dedicated EGR cylinder is run rich of stoichiometric A/F ratio, a significant amount of hydrogen ($H_2$) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen ($H_2$) and carbon monoxide (CO).

An EGR control unit 150 has appropriate hardware (processing and memory devices) and programming for controlling the EGR system. It may be incorporated with a larger more comprehensive engine control unit. Regardless of division of tasks, it is assumed there is control to receive data from any sensors described herein, and to perform various EGR control algorithms. Control signals are generated for the various valves and other actuators of the EGR system. Fuel delivery is controlled such that the dedicated EGR cylinder may operate at an equivalence ratio greater than that of the main cylinders.

For purposes of this description, it is assumed that control unit 150 is specifically configured to determine when the engine is considered to be in a "low load" operating condition. For purposes of this description, "low load" may include idle, cold start, stop-start, and hybrid re-start, as well as low loads.

Conventional sensors and methods may be used to determine the engine load, with the input data referred to herein as "engine load data". To implement the method described herein, control unit 150 determines when the engine is at or below a low load condition in which cylinder deactivation will occur. In the manner described below, control unit 150 then generates appropriate actuation signals to throttles 105 and 107 and to valve 170.

In conventional operation of the engine of FIG. 1, at low loads, the cold-start valve 170 is opened to bleed-off all EGR to the main exhaust line 119. Although this helps to maintain stable combustion, it leads to throttling losses.

Cylinder Deactivation of D-EGR Engine with Split Intake—Mode 1

Figure 2:
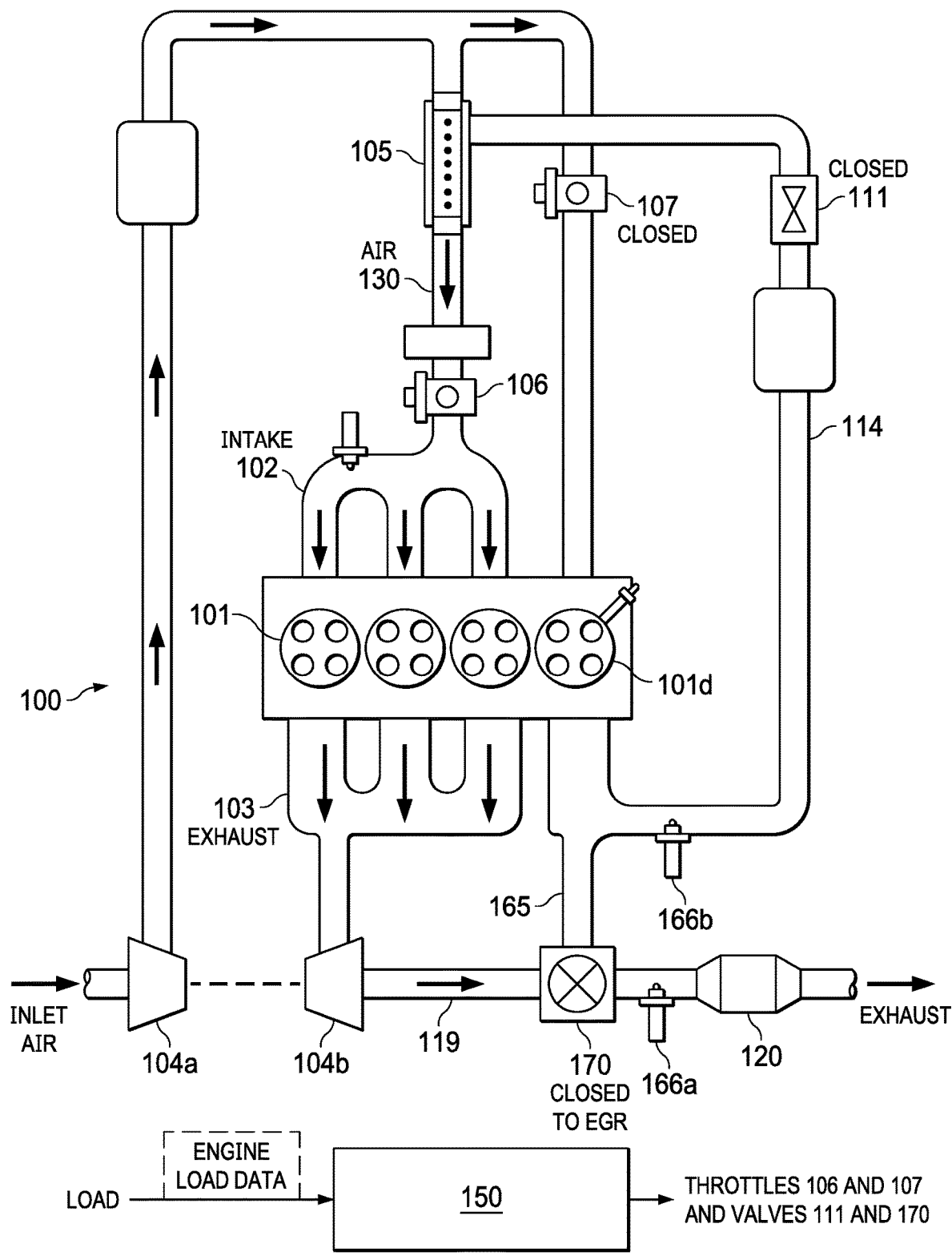
FIG. 2 illustrates Mode 1 of implementing cylinder deactivation in a split intake D-EGR engine.

FIG. 2 illustrates a first mode, Mode 1, of implementing cylinder deactivation in a split intake D-EGR engine. Fuel injection in the D-EGR cylinder 101*d* is disabled. Valves 107 and 111 are closed. The 3-way valve 170 is set so that all the flow from the D-EGR cylinder 101*d* is blocked and is not exhausted from the engine.

This mode of operation of engine 100 effectively reduces engine displacement by 25%. The end result is a 25% cylinder deactivation strategy that only operates on the three main cylinders that are connected to the turbine 104*b*. This mode of cylinder deactivation is referred to herein as Mode 1 CDA.

The method is not limited to the four-cylinder configuration of FIG. 1. For other split intake D-EGR configurations with more than one D-EGR cylinder, the number of D-EGR cylinders undergoing cylinder deactivation can be varied.

In an engine test environment, during CDA Mode 1, for an engine with variable valve timing (VVT), intake and exhaust phasing sweeps may be performed to determine valve phasing for optimum engine performance. In general, at low loads, increased valve overlap increases engine efficiency by decreasing pumping losses. However, the amount of valve overlap is limited by the engine's tolerance for trapped residuals, which deteriorate combustion stability at low loads.

Figure 3:
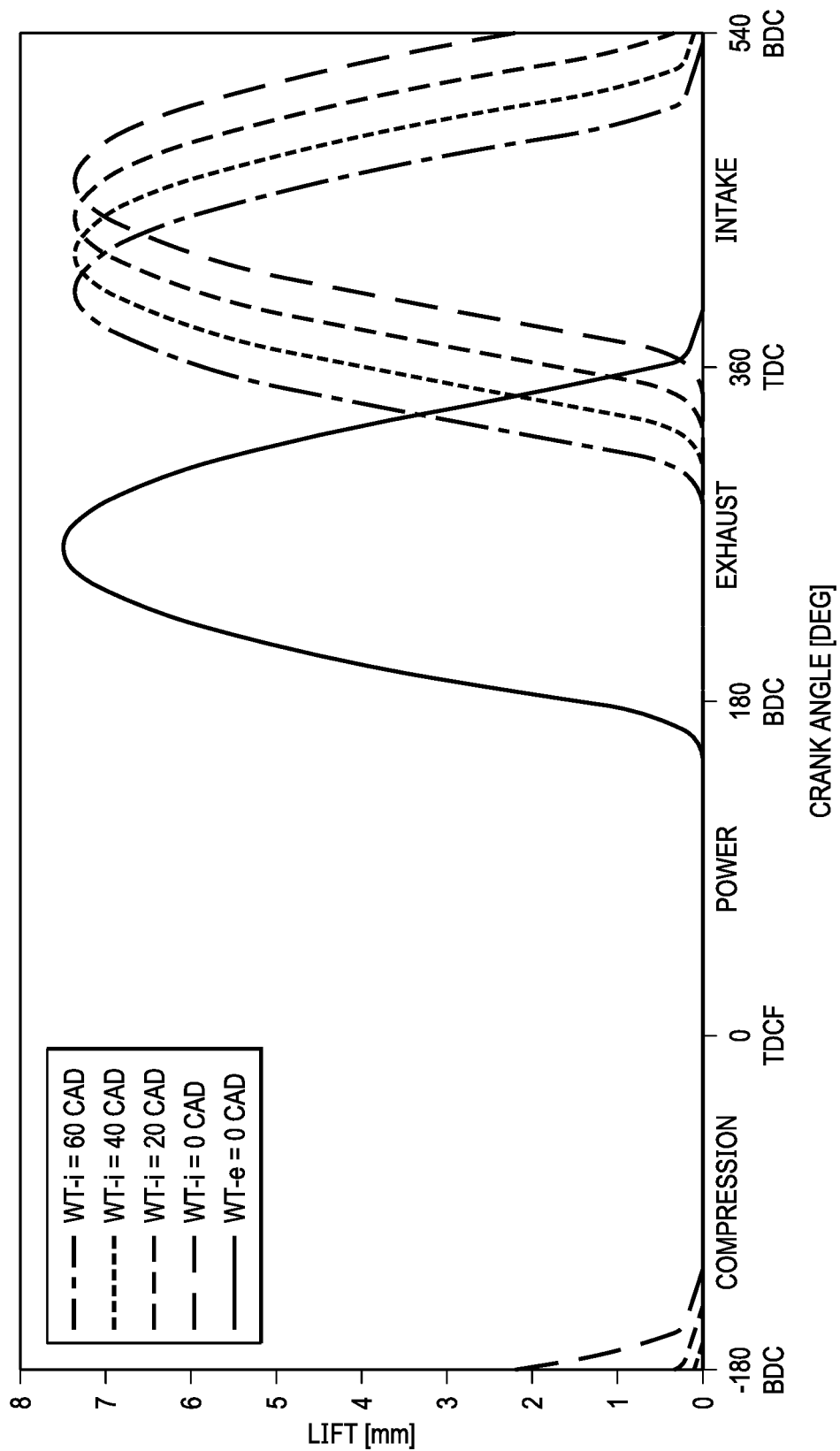
FIG. 3 illustrates an intake valve cam phasing sweep with Mode 1 CDA for a split intake D-EGR engine.

FIG. 3 illustrates an intake cam phasing sweep with Mode 1 CDA for a split intake D-EGR engine operating at 2000 rpm/1 bar BMEP. Valve lift is plotted as a function of crank angle degrees (CAD), for various variable valve timing (VVT) locations of the intake and exhaust valves (VVT-i and VVT-e).

Figure 4:
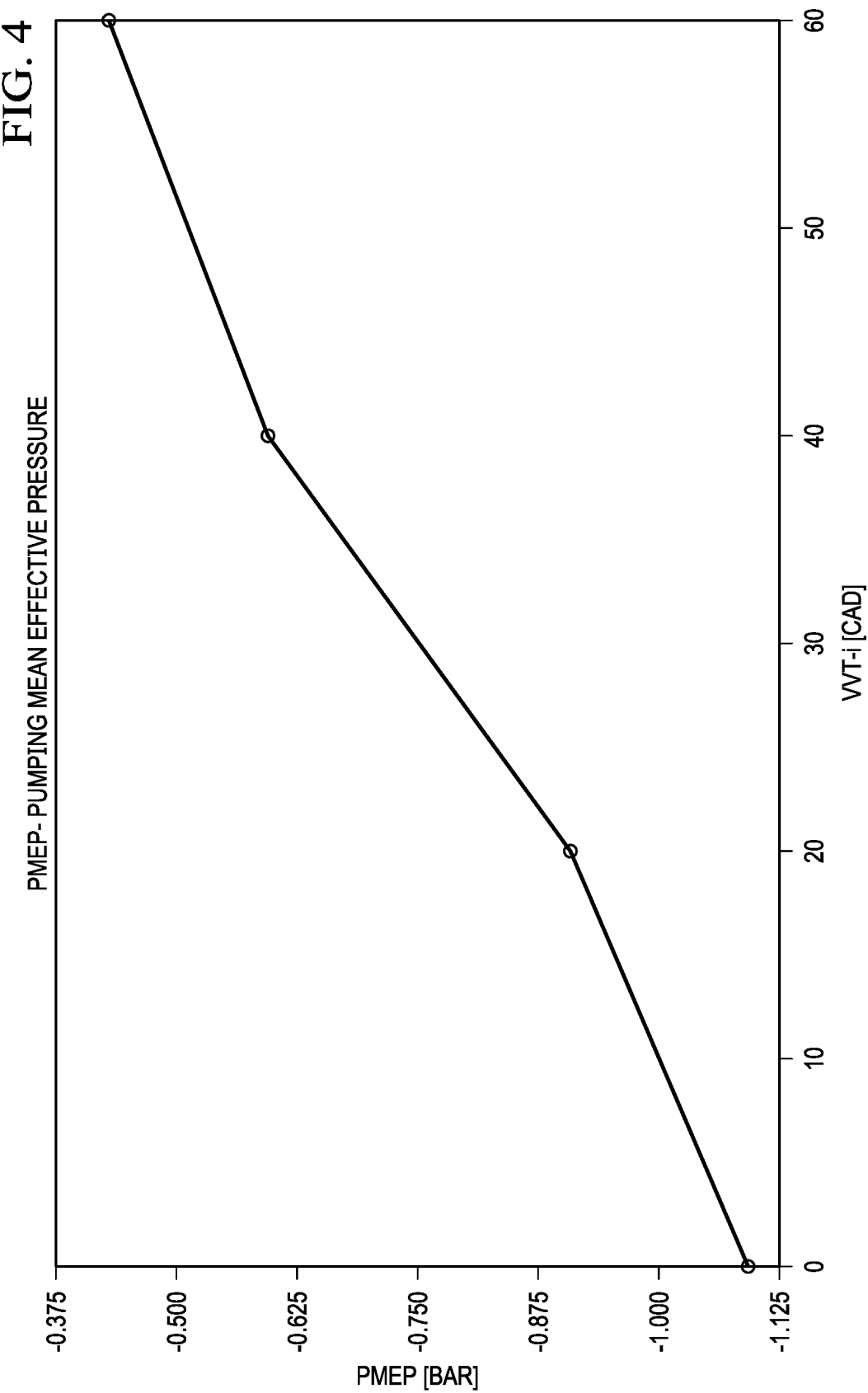
FIG. 4 illustrates PMEP (pumping means effective pressure) during the phasing sweep of FIG. 3.

FIG. 4 illustrates PMEP (pumping means effective pressure) as a function of VVT-i locations, at the engine operating conditions of FIG. 3. As shown in FIG. 4, advancing the intake valve cam by 60 CAD significantly improves pumping work.

Figure 5:
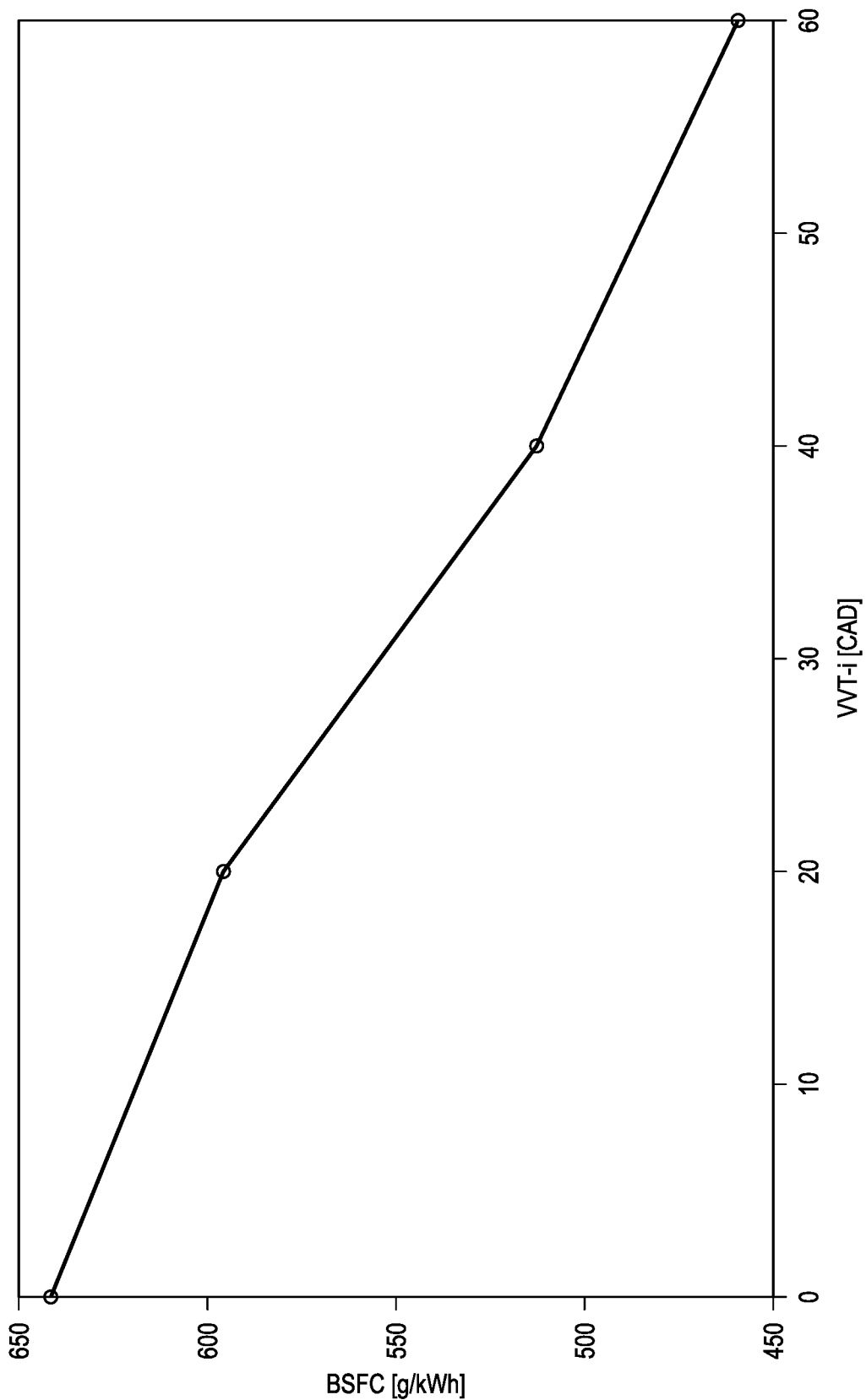
FIG. 5 illustrates BSFC (brake-specific fuel consumption) during the phasing sweep of FIG. 3.

FIG. 5 illustrates BSFC (brake-specific fuel consumption) as a function of VVT-i locations, at the engine operating conditions of FIG. 3. BSFC is a measure of efficiency, and FIG. 5 illustrates the improvement in efficiency with various valve overlaps. Using the maximum amount of intake advance, the BSFC improved by 14.5% from 537 g/kWh to 459 g/kWh, as compared to an engine operating without CDA Mode 1.

Thus, for the example engine of this description, in CDA Mode 1, 60 CAD intake advance (VVT-i=60 CAD) and no exhaust valve retard (VVT-e=0 CAD) resulted in optimum engine performance. Improved combustion stability may lead to better efficiency with additional valve overlap.

Cylinder Deactivation of D-EGR Engine with Split Intake—Mode 2

Figure 6:
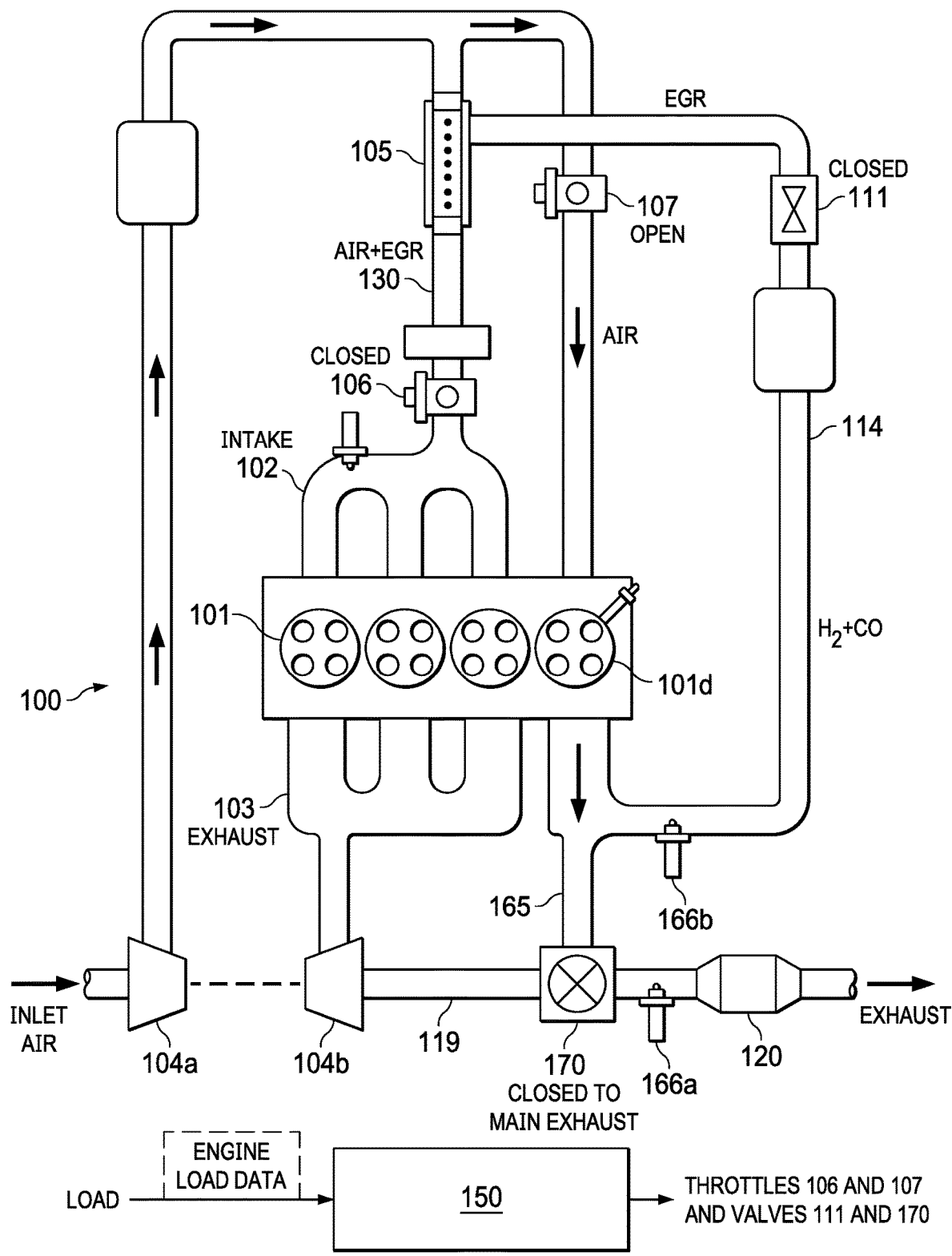
FIG. 6 illustrates Mode 2 of implementing cylinder deactivation in a split intake D-EGR engine.

FIG. 6 illustrates Mode 2 of implementing cylinder deactivation in a split intake D-EGR engine. Fuel injection in the main cylinders 101 is disabled. Valve 107 is open and valve and 111 is closed. The three-way valve 170 is set so that all exhaust flow from the main cylinders 101 is blocked, and all exhaust from the D-EGR cylinder exits the engine through the main exhaust line 119. Main throttle 106 is also closed.

In this mode of CDA, the three main cylinders 101 are effectively deactivated. For this engine, the result is 75% CDA. To enable CDA Mode 2, pumping work of the three deactivated main cylinders 101 must be minimized.

With CDA Mode 2, fuel enrichment in the D-EGR cylinder 101d is avoided. This is because its exhaust gas is no longer being recirculated and re-burned.

Figure 7:
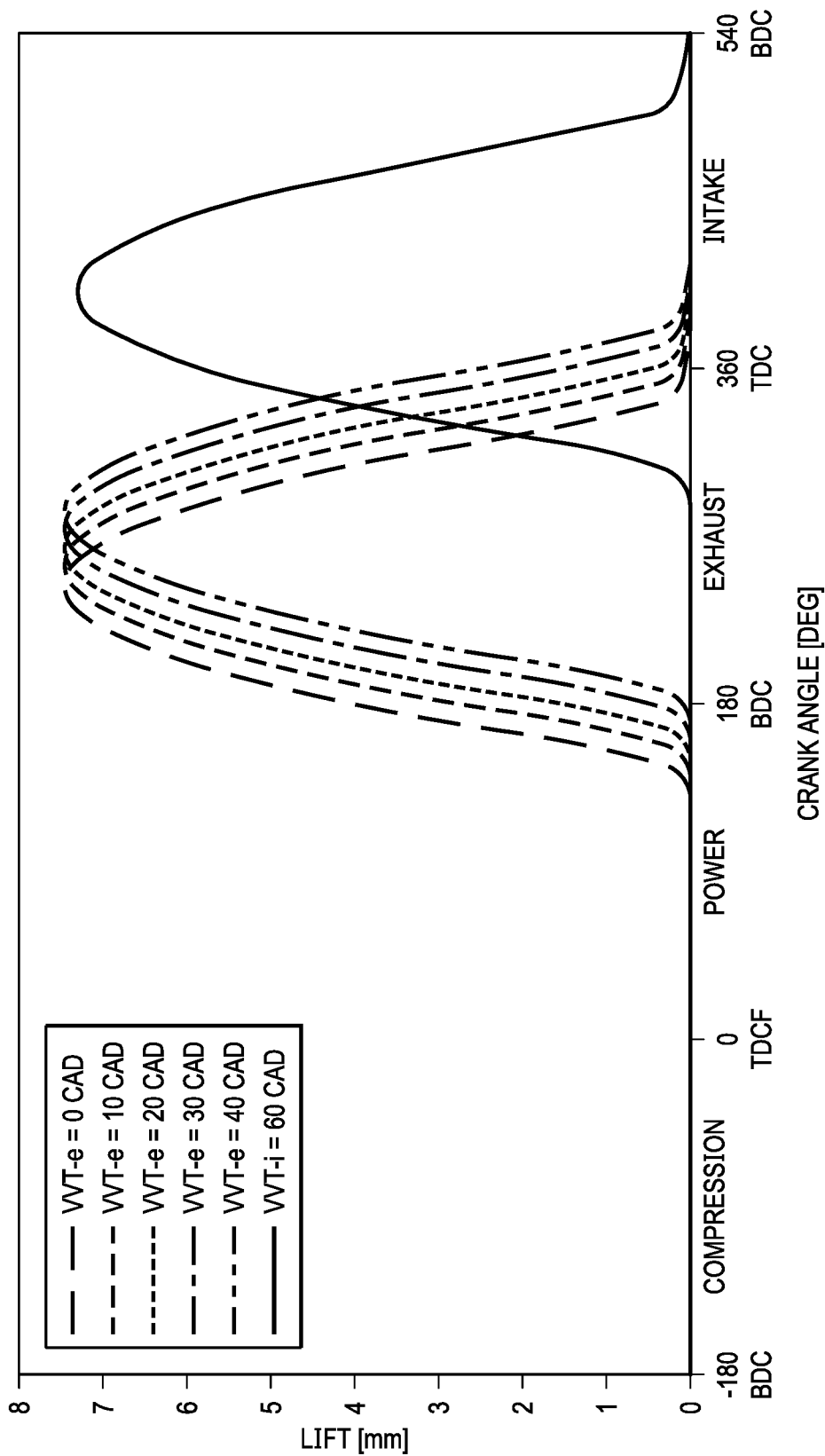
FIG. 7 illustrates an exhaust valve cam phasing with Mode 2 CDA for a split intake D-EGR engine.

FIG. 7 illustrates an exhaust valve cam phasing sweep at 2000 rpm/1 bar BMEP using the CDA Mode 2 of FIG. 6. As described above, in an engine test environment, intake and exhaust phasing sweeps may be performed to determine valve phasing for optimum engine performance.

Figure 8:
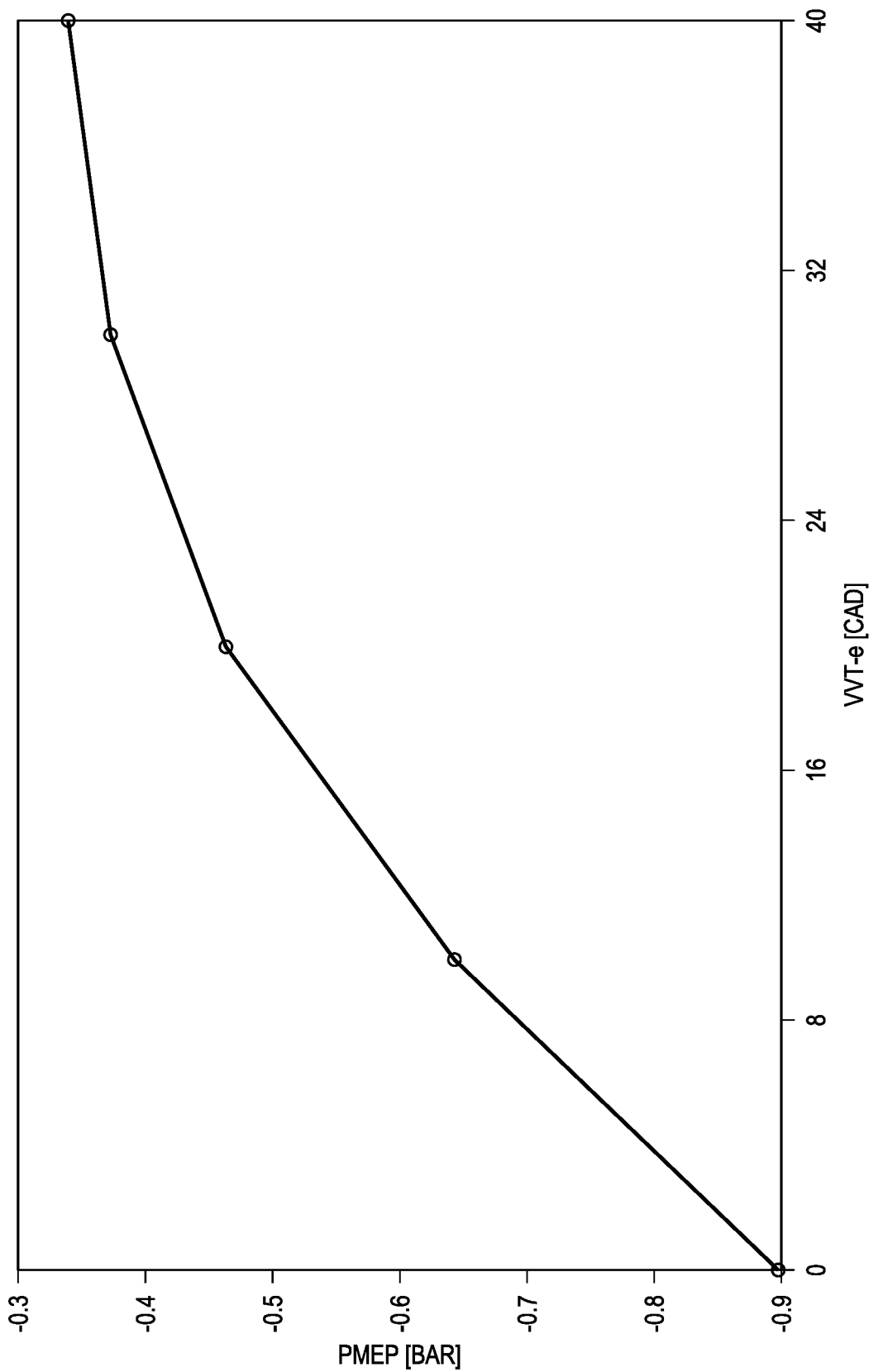
FIG. 8 illustrates the PMEP during the phasing sweep of FIG. 7.

FIG. 8 illustrates the resulting PMEP for the phasing sweep of FIG. 7. At the latest exhaust cam phasing (40 CAD VVT-e), the overall engine pumping work was nearly decreased by a factor of three (from −0.9 bar to −0.33 bar). Using the largest valve overlap with this configuration (VVT-i=60 CAD/VVT-e=40 CAD), the required net IMEP for the D-EGR cylinder was 8 bar to drive the entire engine at the 2000-rpm/1-bar condition. This requirement of the high D-EGR cylinder IMEP to drive the three deactivated main cylinders limits CDA Mode 2 to approximately 1.5 bar BMEP for the example engine of this description (a four-cylinder split intake D-EGR engine with one D-EGR cylinder).

Thus, for the example engine of this description, in CDA Mode 2, engine efficiency was optimized by combining maximum intake valve advance with some level of exhaust valve retard.

Comparisons

Figure 9:
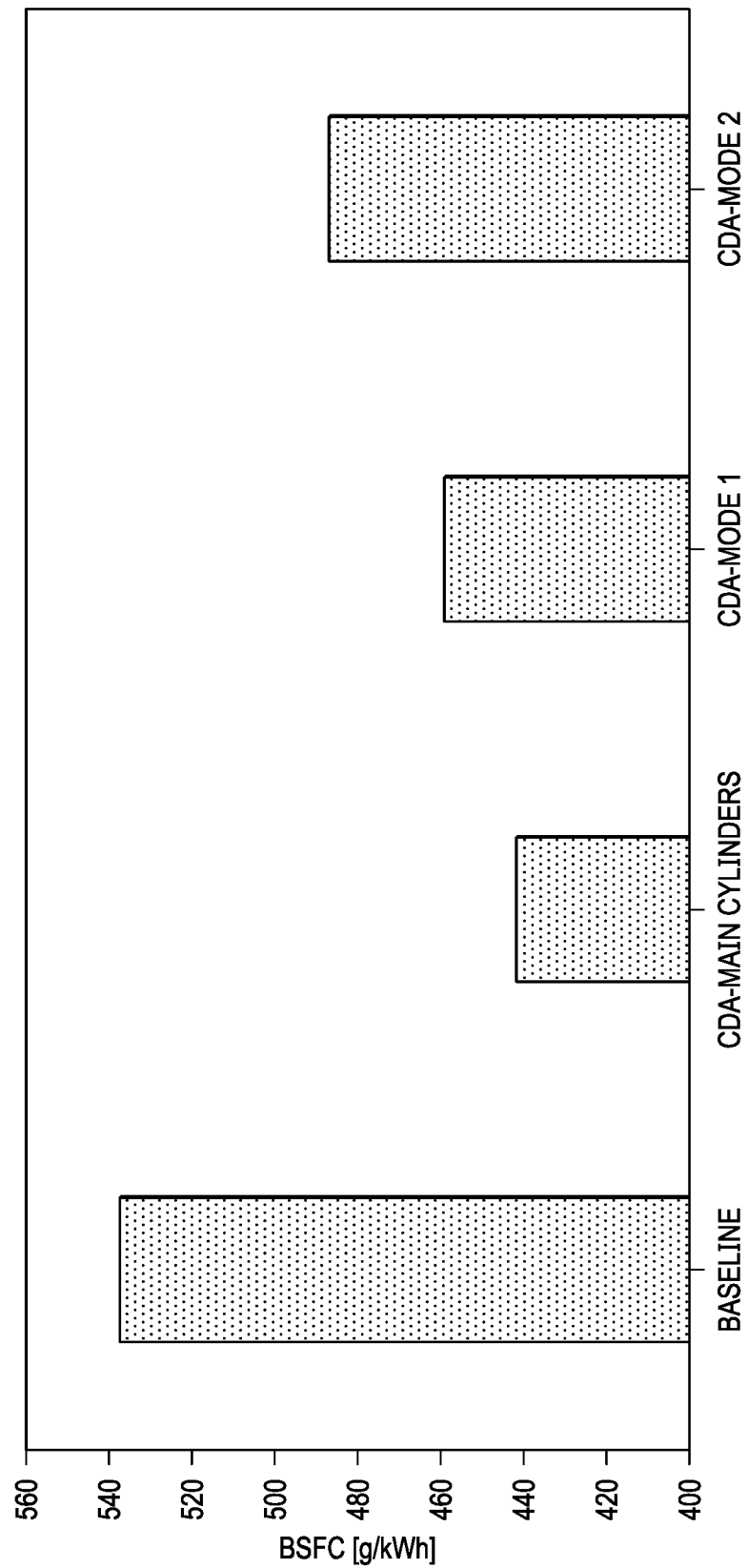
FIG. 9 illustrates a BSFC comparison for different operating modes of a split intake D-EGR engine at a low load condition.

FIG. 9 illustrates a BSFC comparison for different operating modes of a split intake D-EGR engine at the 2000 rpm/1 bar BMEP low load condition. The first column shows a baseline mode, in which all EGR is bled-off to maintain good combustion stability and low emissions. The second column shows conventional "lost motion" CDA on the main cylinders, in which 75% CDA is achieved with closed intake and exhaust valves of the main (deactivated) cylinders. The third and fourth columns show CDA Modes 1 and 2 as described above.

Lost motion CDA offers the best BSFC reduction but requires a special valve train. However, CDA Modes 1 and 2 also enable efficiency improvement in the range of 15% and 9% respectively with a basic stock valvetrain.

A particular advantage of CDA Mode 2 is the ability to maintain high exhaust catalyst temperatures for superior emissions conversion efficiency and emissions legislations compliance. The reasons for this are two-fold. First, the turbocharger, which is a large heat sink through its thermal mass, is completely bypassed. Second, the IMEP in the D-EGR cylinder increases significantly. This results in much higher in-cylinder and exhaust gas temperatures.

Figure 10:
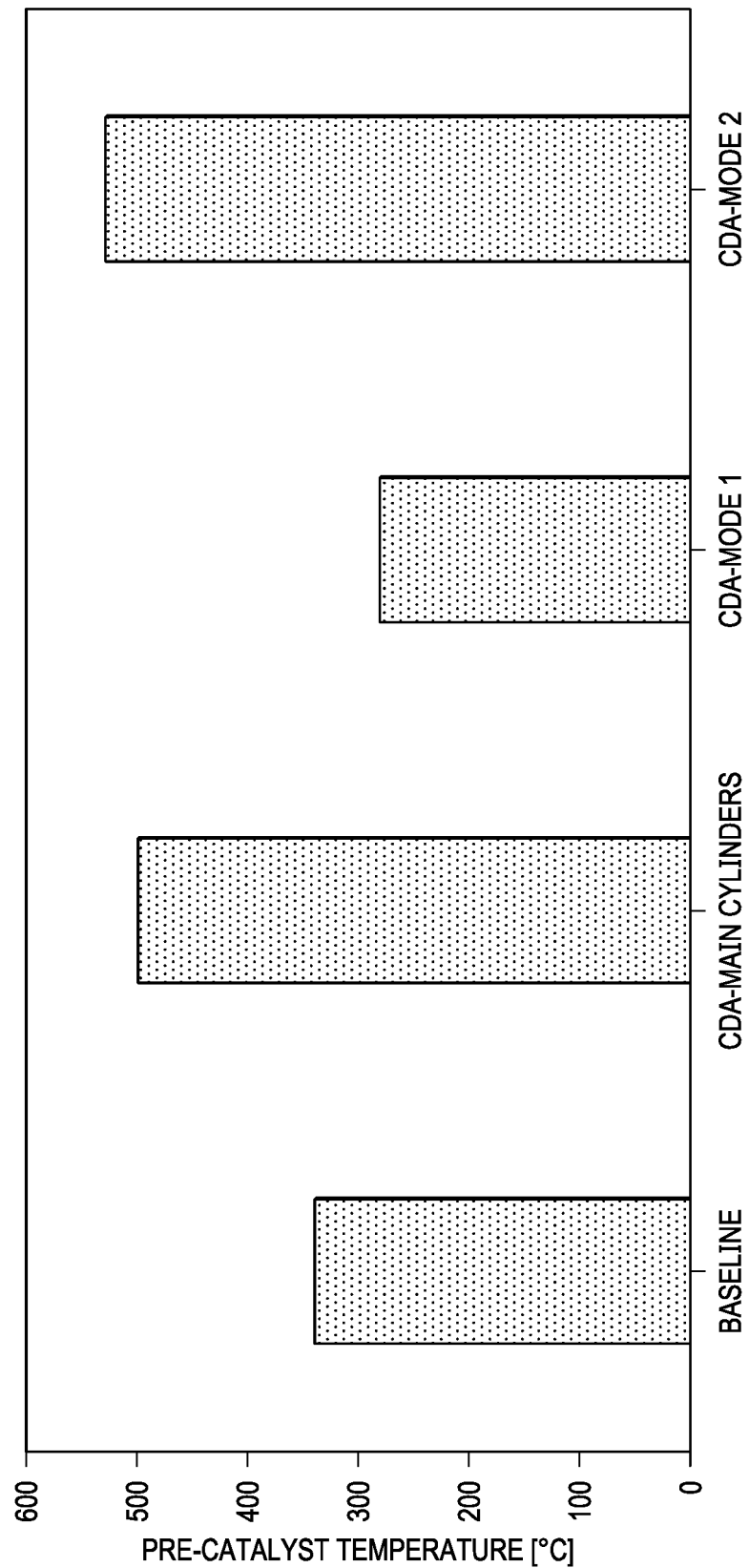
FIG. 10 illustrates how CDA Mode 2 increases the pre-catalyst temperature of an exhaust gas aftertreatment catalyst, as compared to a baseline.

FIG. 10 illustrates how CDA Mode 2 increases the pre-catalyst temperature as compared to a baseline. In the example engine of this description, this increase is from 340° C. to 530° C. If a vehicle with a start-stop strategy is being used, or a hybrid vehicle that is in full electric drive mode, the catalyst can cool down below its light-off temperature. To maintain full catalyst conversion efficiency for the next engine start, the catalyst must be electrically heated or the engine turned-on before it would have been required from a power demand perspective. Both cases require additional energy to maintain catalyst conversion efficiency. If the second CDA mode is used, the catalyst temperature will be higher and accelerated catalyst heating strategies, such as additional post fuel injections, can be avoided due to the quicker catalyst warm-up. This also enables the engine to be turned-off for longer periods of time during regular start-stop or hybrid operations.

Figure 11:
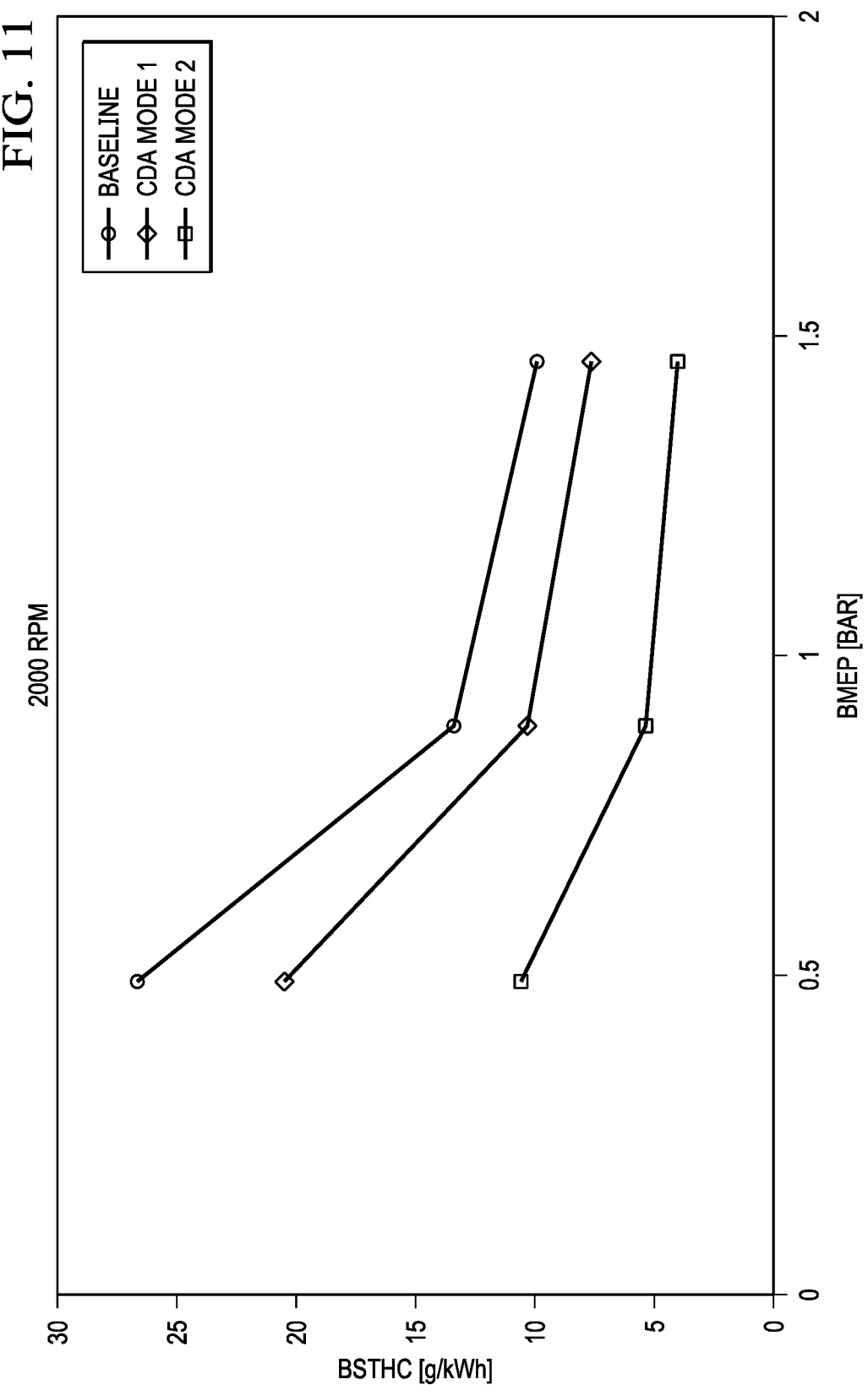
FIG. 11 illustrates BSTHC (brake specific total hydrocarbon) emissions for a low load sweep during a baseline mode and Modes 1 and 2.

FIG. 11 illustrates shows brake specific total hydrocarbon (BSTHC) emissions during a low load sweep (BMEP=0.5 to 1.5) at 2000 rpm. A baseline mode, as well as CDA Modes 1 and 2 are illustrated. For all engine modes, at lower loads, hydrocarbon emissions generally increase due to lower combustion and post-oxidation temperatures along with decreased burn rates and increased combustion instabilities. Because the CDA modes allow the non-deactivated cylinders to be operated at a higher specific load, the engine-out emissions decrease.

What is claimed is:

1. A method of operating a split intake D-EGR (dedicated exhaust gas recirculation) engine having at least one D-EGR cylinder and a number of non-EGR cylinders, the D-EGR cylinder(s) having a separate air intake line from the main throttle and intake manifold of the non-EGR cylinders and delivering EGR to the non-EGR cylinders via an EGR loop, comprising:

providing the engine with a D-EGR valve, for controlling intake of recirculated exhaust to non-EGR cylinders;

providing the engine with a D-EGR throttle on the separate air intake line;

providing the engine with a three-way valve, selectively operable to allow no exhaust from the non-EGR cylinders to be exhausted from the engine or to allow no exhaust from the D-EGR cylinder(s) to be exhausted from the engine;

during operation of the engine, determining whether the engine is in a low load operating condition;

if the engine is in a low load operating condition, performing either a first cylinder deactivation mode or a second cylinder deactivation mode;

wherein the first cylinder deactivation mode is performed by disabling fuel delivery to the D-EGR cylinder(s), closing the D-EGR throttle, closing the D-EGR valve, and operating the three-way valve such that no exhaust from the D-EGR cylinder(s) is exhausted;

wherein the second cylinder deactivation mode is performed by disabling fuel delivery to the non-EGR cylinders, opening the D-EGR throttle, closing the D-EGR valve, closing the main throttle, and operating the three-way valve such that no exhaust from the main cylinders is exhausted.

2. The method of claim 1, wherein the engine has variable valve timing, and wherein the first cylinder deactivation mode is performed with valve overlap.

3. The method of claim 2, wherein the valve overlap is achieved with no exhaust valve retard and maximum intake valve advance.

4. The method of claim 1, wherein the engine has variable valve timing, and wherein the second cylinder deactivation mode is performed with valve overlap.

5. The method of claim 4, wherein the valve overlap is achieved with both exhaust valve retard and intake valve advance.

6. The method of claim 1, wherein the engine is a start-stop engine and the second cylinder deactivation mode is performed during re-start.

7. The method of claim 1, wherein the engine is a hybrid engine and the second cylinder deactivation mode is performed during re-start after electric drive mode.

8. An improved internal combustion engine, comprising:
- at least one D-EGR (dedicated exhaust gas recirculation) cylinder, with remainder of the cylinders being non-EGR cylinders receiving intake air from an intake manifold and exhausting emissions through a main exhaust line;
- a separate intake line for the D-EGR cylinder(s), providing intake air to the D-EGR cylinder independent of the intake manifold;
- an EGR loop for delivering EGR from the D-EGR cylinder(s) to the main cylinders via the intake manifold;
- an EGR exhaust line connecting the EGR loop to the main exhaust line;
- a D-EGR valve, installed on the EGR loop, for controlling intake of recirculated exhaust to the non-EGR cylinders;
- an EGR throttle on the separate air intake line;
- a three-way valve, configured to receive exhaust from the main exhaust line and from the EGR exhaust line, and operable to allow no exhaust from the non-EGR cylinders to be exhausted from the engine or to allow no exhaust from the D-EGR cylinder(s) to be exhausted from the engine;
- an engine control unit, configured to perform the following tasks: during operation of the engine, determining whether the engine is in a low load operating condition; if the engine is in a low load operating condition, performing either a first cylinder deactivation mode or a second cylinder deactivation mode; wherein the first cylinder deactivation mode is performed by disabling fuel delivery to the D-EGR cylinder(s), closing the D-EGR throttle, closing the D-EGR valve, and operating the three-way valve such that no exhaust from the D-EGR cylinder(s) is exhausted; wherein the second cylinder deactivation mode is performed by disabling fuel delivery to the non-EGR cylinders, opening the D-EGR throttle, closing the D-EGR valve, closing the main throttle, and operating the three-way valve such that no exhaust from the main cylinders is exhausted.

9. The engine of claim 8, wherein the engine has variable valve timing, and wherein the first cylinder deactivation mode is performed with valve overlap.

10. The engine of claim 9, wherein the valve overlap is achieved with no exhaust valve retard and maximum intake valve advance.

11. The engine of claim 8, wherein the engine has variable valve timing, and wherein the second cylinder deactivation mode is performed with valve overlap.

12. The engine of claim 11, wherein the valve overlap is achieved with both exhaust valve retard and intake valve advance.

13. The engine of claim 8, wherein the engine is a start-stop engine and the second cylinder deactivation mode is performed during re-start.

14. The engine of claim 8, wherein the engine is a hybrid engine and the second cylinder deactivation mode is performed during re-start after electric drive mode.

* * * * *